May 13, 1969   J. I. GREENBERGER   3,443,805
SEVERING STATION FOR MOVING WORKPIECES
Filed Nov. 22, 1966
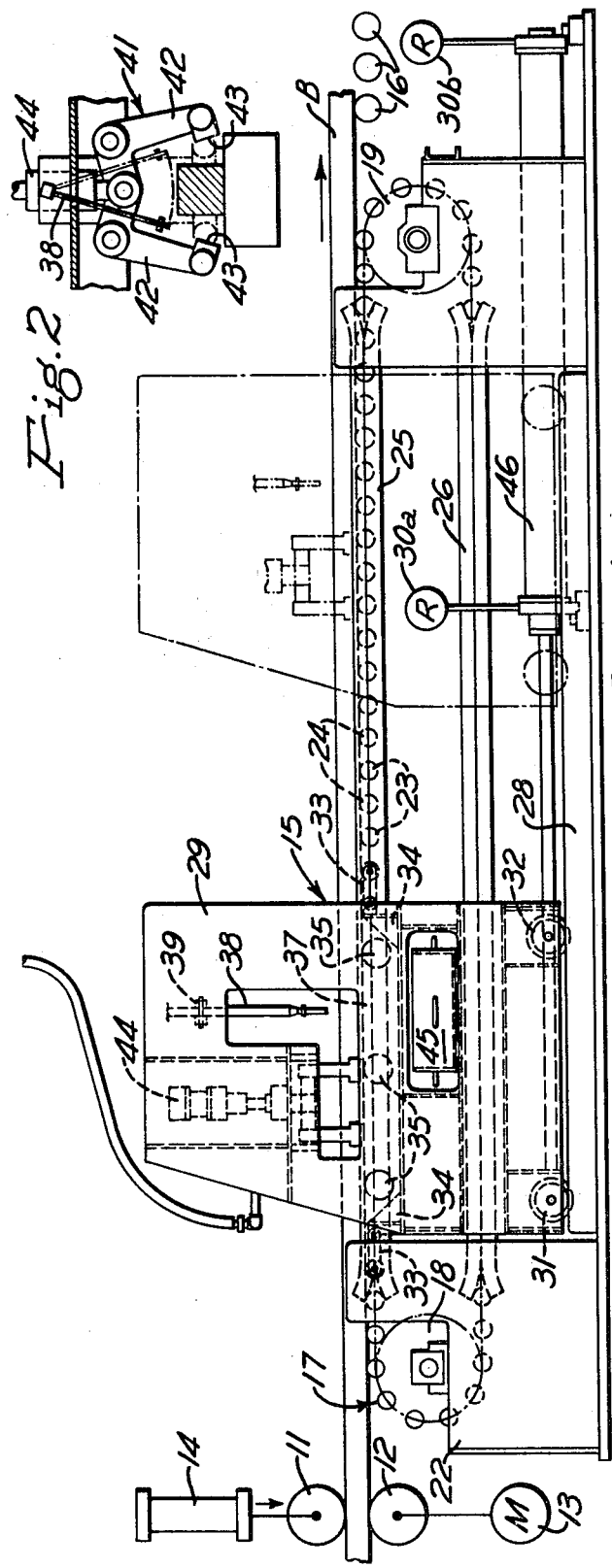
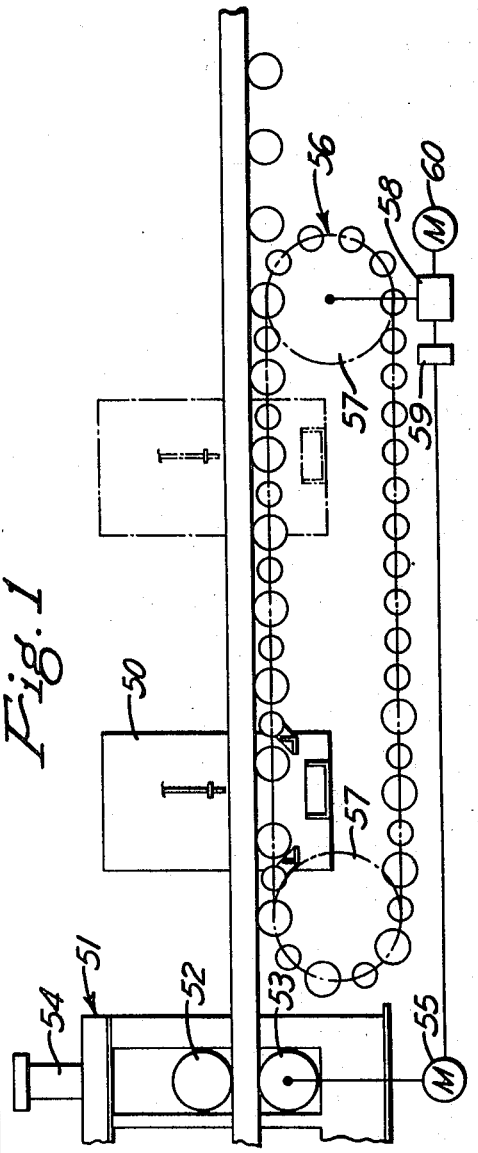
INVENTOR.
JOSEPH I. GREENBERGER
BY
ATTORNEY.

United States Patent Office 3,443,805
Patented May 13, 1969

3,443,805
SEVERING STATION FOR MOVING WORKPIECES
Joseph Irwin Greenberger, Pittsburgh, Pa., assignor to United Engineering and Foundry Company, Pittsburgh, Pa., a corporation of Pennsylvania
Filed Nov. 22, 1966, Ser. No. 596,150
Claims priority, application Great Britain, Dec. 9, 1965, 52,396/65
Int. Cl. C21b
U.S. Cl. 266—23                  10 Claims

ABSTRACT OF THE DISCLOSURE

The present invention relates to a torch cutoff device and, more particularly, to such a device constructed and arranged to sever elongataed pieces as they move along a selected path of travel.

Background of invention

In the manufacturing of elongated metallic products, such as, slabs, billets, and plates, it is necessary for any number of reasons to sever the workpieces. This is usually accomplished by providing a mechanical shear or, in other cases, by cutting the workpieces by a gas torch which, in certain cases, is more economical. While some applications lend themselves much better to the utilization of a torch, in the instance where the workpiece must be severed while traveling along a selected path, the employment of the torch, although very desirable from an economical standpoint, presents a serious problem. Since the workpiece and torch during the cutting operation must move together, whereas the workpiece supporting means remains fixed, there is always the danger that the torch will inadvertently cut into the workpiece supporting means. For this reason, the use of a torch in this particular application has not been realized.

It is an object of the present invention to provide a torch cutoff device which can be employed to sever moving workpieces and wherein there will be no danger of inadvertent damage to the supporting elements of the workpiece.

It is another object of the present invention to provide, in combination with means for advancing a workpiece over a selected path, a conveyor means for supporting the workpiece while passing through said cutoff station, a carriage mounted in the cutoff station adapted to be traversed in a direction of the movement of the workpiece, means for connecting the carriage to the conveyor so that the conveyor, carriage and workpiece will move in fixed relationship, the conveyor consisting of a workpiece supporting element so constructed as to provide an opening and the carriage carrying a torch projecting above the opening and adapted to cut through a workpiece in the area of the opening. The correlation between the carriage, torch and workpiece relative to the conveyor may be accomplished in a number of ways. One way would be to provide clamps on the carriage which would engage the workpiece; thereby, the workpiece would be employed to advance the carriage and conveyor during the cutting period.

Another way of correlating the carriage with the workpiece relative to the conveyor would be to provide a common drive means for the workpiece advancing means and the conveyor to which the carriage is secured. In this arrangement the common drive means would be adapted to be interrupted to allow the conveyor and carriage to be repositioned after a cutting operation has been performed.

These and other objects and advantages of the present invention will be more readily understood when the following description of two embodiments of the invention is read along with the accompanying drawings of which:

FIGURE 1 is an elevational view of one form of the present invention in which the invention is employed to sever elongated metallic billets;

FIGURE 2 is a fragmental view of the clamp and torch elements illustrated in FIGURE 1; and FIGURE 3 is an elevational, schematic view of a second embodiment of the present invention.

Description of invention

With reference to FIGURE 1, there is illustrated an elongated metallic billet B, such as produced by a billet rolling mill, or a continuous casting machine. The billet is adapted to be advanced in the direction indicated by the arrow by a pair of pinch rolls 11 and 12, the roll 12 being driven by a motor 13, whereas the roll 11 is vertically adjustable through the agency of the piston cylinder assembly 14, all according to well-known practice. Following the pinch roll there is provided a cutoff station 15, after which there is provided a number of billet supporting rollers 16. Between the pinch rolls 11 and 12 and the supporting rollers 16, in the station 15 there is provided a torch cutoff mechanism. In describing the torch cutoff mechanism, reference is made first to a conveyor 17 having two pairs of spaced-apart sprockets 18 and 19 which are rotatably mounted in a frame 22 which extends approximately the full length of the station 15. The conveyor may take the form of any number of well-known chain type conveyors although in the present instance, it is recommended that certain of the rollers thereof, at equal intervals, be made full length so as to provide an adequate support for the workpiece moving from the pinch rolls 11 and 12 through the station 15. Thus, in FIGURE 1 the workpiece supporting rollers 23 are to be understood as extending the full width of the billet; whereas, the rollers 24, which constitute the chain rollers of the conveyor, need only be long enough to engage the sprockets 18 and 19. As is customary, the chain rollers 24 are guided in the guide troughs 25 and 26.

The frame 22 is provided with a pair of horizontal rails 28 which runs approximately the full length of the station 15. The rails are adapted to support two pairs of flanged wheels 31 and 32 of a carriage 29 and by which means the carriage is traversed from the full line position shown in FIGURE 1, which represents the initial cutoff position to the outlined position which represents the completed cutoff position of the carriage. Upward from the wheels 31 and 32 of the carriage 29, the carriage is connected positively at its opposite sides to the conveyor 17 by means of links 33. In this connection the carriage 29 is provided with brackets 34 to which the links 33 are pivotally secured. It will be noted that between the brackets 34 the conveyor is provided with three relatively larger diameter rollers 35, as compared with the rollers 23 and 24 thereof. These rollers 35 provide a supporting surface for the billet in the actual cutoff zone, the spacing between the rollers 35 being such as to provide sufficient room to enable a manipulation of the torch and to avoid any danger of being damaged by the torch. This is particularly true with respect of the two rollers more closely adjacent to the delivery side of the carriage 29 which forms an opening 37 into which opening the flame of the torch extends to sever the billet.

Upward of the rollers 35 the carriage 29 is adapted to support a downwardly extending torch 38 which is trunnion mounted at 39 so as to enable it to pass through an arc equal of the width of the workpiece to be cut. The torch mechanism, of course, may follow any number of well-known designs and since its particular design is not a part of the present invention, further discussion thereof will not be given.

FIGURE 2, in some respects, better illustrates the movement of the torch through its arcuate path. It also serves to illustrate a clamping device 41 carried by the carriage 29 which is employed to grip the billet whereby the carriage can be connected to the billet and, hence, the conveyor, carriage and billet can be advanced in unison. The clamping device 41 consists of two identical arms 42 which extend downwardly and have at their lower ends opposed clamping surfaces 43 which are adapted to be brought into forcible contact with the opposed vertical sides of the billet. Arms 42 are manipulated in scissor-like fashion by a piston cylinder assembly 44 which is trunnionly mounted in the carriage 29.

Calling attention again to the carriage 29, it will be noted that directly below the opening 37 formed between two of the rollers 35, there is provided a kerf box 45 which is actually a receptacle designed to receive the heated particles of metal formed in the cutting process and also to restrict and restrain the gas that protrudes through the billet once it has been cut through. While in the particular instance the carriage 29 and conveyor 17 are adapted to be advanced in the direction of the arrow by virtue of the billet B, a piston cylinder assembly 46 is provided at the base of the frame 22 connected to the carriage and adjusted to move the carriage 29 and the conveyor from the right-hand position to the left-hand position, namely, that indicated in full line in FIGURE 1. Should the workpiece not possess sufficient strength because of its size to permit it to be used to advance the carriage, the piston cylinder assembly 46 can be made double acting and its movement controlled so that the fixed relationship between the torch, workpiece and carriage is maintained but, yet, the hot pliable workpiece will not be required to move the carriage. The cylinder assembly 46 is intended to function in this manner, if the circumstances require, and for which reason pressure regulators 30a and 30b are connected to the front and back of the cylinder assemblies, respectively. The pressure regulator 30a will allow the cylinder assembly to move the carriage in the direction of and at approximately the same rate as the workpiece, the clamp, however, assuring that the fixed relationship is maintained.

From the above description, it can be appreciated that a billet being advanced through the station 15 by the pinch rolls 11 and 12 will be supported by one or more of the rollers 23 and 35 of the conveyor 17 until its leading end comes in contact with the support rollers 16.

While not specifically indicated, should it be the desire to cut the billet into predetermined desired lengths, the operation of the clamp cylinder 44 can be controlled by a length-measuring device of several well-known types. As noted above, the present invention provides for the carriage and conveyor 17 to be advanced by the billet which is advanced forward by virtue of the driving effect of the pinch rolls 11 and 12. At the same time the torch will be operated and manipulated to sever the billet as the carriage 29 is moving in the direction of the arrow. The distance of travel of the carriage 29 will provide sufficient time for the torch to cut through the billet without any necessity to retard its forward speed. As the carriage reaches the end of the station 15, the piston cylinder assembly 43 of the clamping device 41 will be operated to release the billet and allow it to pass onto the rollers 16. At the same time the piston cylinder assembly 46 will be operated to reposition the carriage 29 and the conveyor 17 to the initial position.

As it was noted previously, FIGURE 3 relates to a second embodiment of the present invention. Since many of the components are the same as illustrated in FIGURE 1, they will not be described again.

FIGURE 3, however, is different from the embodiment of FIGURE 1 with reference to the manner in which the carriage and conveyor are advanced relative to the moving billet. In FIGURE 1 this was accomplished by providing the clamping device 41 whereby the carriage was secured to the moving billet and the billet itself was employed to advance the carriage and conveyor. In FIGURE 3 the carriage 50 is not provided with a clamping device, but instead the pinch rolls and the conveyor are driven synchronously in the direction of the movement of the billet. Accordingly, in FIGURE 3 there is provided a pinch roll unit 51 consisting of an upper roll 52 and a lower roll 53, the upper roll being vertically adjustable relative to the billet by a piston cylinder assembly 54. The roll 53 is driven by a motor 55. With respect to the conveyor 56 of the arrangement in FIGURE 3, one pair of its sprockets 57 is driven by the motor 55 through a gear box 58 and clutch 59. The gear box and sprocket 57 are also adapted to be driven by the motor 60. The motor 55 will drive the sprockets in the same direction as the direction of the billet, whereas the motor 60 will drive them in an opposite direction for the purpose of repositioning the carriage 50. The carriage 50, as in the case of FIGURE 1, is connected positively to the conveyor 56 and adapted to be advanced with the conveyor. Thus, in the arrangement of FIGURE 3 when the carriage is in its initial position, as shown in full line, and the motor 60 is inoperative, upon operation of the pinch roll motor 55 and the closing of the clutch 59, the billet and carriage will be advanced in unison and during which period the billet will be severed. When the cutting operation is complete and the carriage has advanced to the outlined position of FIGURE 3, the clutch 59 will be disengaged and the motor 60 operated to move the conveyor in a direction opposite to the path of travel of the billet whereby the carriage 50 will be repositioned for the next cutting operation.

In describing the present invention certain specific designs and details have been referred to, however, it will be appreciated by those skilled in the art that the present invention can be utilized otherwise than what is specifically illustrated and described.

In accordance with the provisions of the patent statutes, I have explained the principle and operation of my invention and have illustrated and described what I consider to represent the best embodiment thereof. However, I desire to have it understood that the invention may be practiced otherwise than as specifically illustrated and described.

I claim:
1. In combination with a workpiece severing station, means for moving a workpiece over a selected path through said station,
a conveyor means for supporting the workpieces while passing through said station in a manner that a portion of the side of the workpiece adjacent the conveyor is unsupported,
a carriage mounted in the station traversable in a direction of the movement of the workpiece,
means for connecting the carriage to the conveyor so that the conveyor and carriage move together in fixed relationship in at least one direction,
means mounted on said carriage for movement with the carriage for selectively connecting a carriage to the workpiece, and
workpiece severing means mounted on said carriage arranged to direct its cutting agent in the direction of the unsupported portion of said workpiece for severing the workpiece.

2. In combination with a workpiece severing station according to claim 1, in which said connecting means mounted on said carriage includes
a clamping means carried by said carriage,
means for bringing said clamping means into forcible engagement with a workpiece thereby said carriage and said conveyor will be advanced with the workpiece without any relative movement therebetween during the cutting period, and means for returning the carriage to a starting position after the completion of the severing of a workpiece.

3. In combination with a workpiece severing station according to claim 2,
wherein said clamping means comprises a pivotally mounted pair of arms,
means for actuating the arms to bring them into a clamping position with the workpiece.

4. In combination with a workpiece severing station according to claim 1,
separate but interconnectable drive means for said workpiece moving means and said conveyor, and
means for selectively connecting said drive means.

5. In combination with a workpiece severing station according to claim 1, where said workpiece cutoff means comprises
a gas torch carried by said carriage arranged directly above the unsupporting area of said conveyor.

6. In combination with a workpiece severing station according to claim 5,
wherein said gas torch is pivotally mounted on said carriage above the workpiece.

7. In combination with a workpiece severing station according to claim 1,
wherein said carriage is constructed so as to allow a workpiece to pass between its two opposed sides.

8. In combination with a workpiece severing station according to claim 1, in which said means for advancing the workpiece comprises a pair of pinch rolls,
means for driving the pinch rolls at a speed substantially synchronous with the movement of the workpiece.

9. Apparatus in combination with a workpiece severing station according to claim 1,
reversible drive means for said conveyor adapted to advance the conveyors during the cutting period and then return it to an initial starting position.

10. In combination with a workpiece severing station according to claim 1,
in which the conveyor comprises a pair of spaced-apart conveying chains,
a pair of spaced-apart workpiece supporting rolls extending between said chains forming said unsupporting area of said conveyor,
said cutoff means carried by said carriage arranged above the space between said rolls.

References Cited

UNITED STATES PATENTS 2,290,271   7/1942   Bucknam.
3,227,432   1/1966   McDermott.
3,291,470   12/1966   Lotz.

JOHN J. CAMBY, *Primary Examiner.*